United States Patent
Hanazawa et al.

(10) Patent No.: US 8,880,400 B2
(45) Date of Patent: Nov. 4, 2014

(54) VOICE RECOGNITION DEVICE

(75) Inventors: Toshiyuki Hanazawa, Tokyo (JP); Yohei Okato, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 587 days.

(21) Appl. No.: 13/254,654

(22) PCT Filed: Jan. 27, 2010

(86) PCT No.: PCT/JP2010/051030
§ 371 (c)(1),
(2), (4) Date: Sep. 2, 2011

(87) PCT Pub. No.: WO2010/100977
PCT Pub. Date: Sep. 10, 2010

(65) Prior Publication Data
US 2012/0041756 A1 Feb. 16, 2012

(30) Foreign Application Priority Data
Mar. 3, 2009 (JP) .................. 2009-049153

(51) Int. Cl.
*G10L 15/02* (2006.01)
*G10L 15/08* (2006.01)

(52) U.S. Cl.
CPC ............... *G10L 15/08* (2013.01); *G10L 15/02* (2013.01)
USPC .......................................................... 704/254

(58) Field of Classification Search
USPC ................................. 704/251–257
See application file for complete search history.

(56) References Cited

U.S. PATENT DOCUMENTS 6,985,861 B2 * 1/2006 Van Thong et al. ........... 704/254
7,120,582 B1 10/2006 Young et al.
(Continued)

FOREIGN PATENT DOCUMENTS

CN 1293428 A 5/2001
CN 1711586 A 12/2005
(Continued)

OTHER PUBLICATIONS

Extended European Search Report issued Sep. 3, 2012, in European Patent Application No. 10748574.0
(Continued)

*Primary Examiner* — Abul Azad
(74) *Attorney, Agent, or Firm* — Oblon, Spivak, McClelland, Maier & Neustadt, L.L.P.

(57) ABSTRACT

Voice recognition is realized by a pattern matching with a voice pattern model, and when a large number of paraphrased words are required for one facility, such as a name of a hotel or a tourist facility, the pattern matching needs to be performed with the voice pattern models of all the paraphrased words, resulting in an enormous amount of calculation. Further, it is difficult to generate all the paraphrased words, and a large amount of labor is required. A voice recognition device includes: voice recognition means for applying the voice recognition to an input voice by using a language model and an acoustic model, and outputting a predetermined number of recognition results each including a set of a recognition score and a text representation; and N-best candidate rearrangement means for: comparing the recognition result to a morpheme dictionary held in a morpheme dictionary memory; checking whether a representation of the recognition result can be expressed by any one of combinations of the morphemes of the morpheme dictionaries; correcting the recognition score when the representation can be expressed; and rearranging an order according to the corrected recognition score so as to acquire recognition results.

8 Claims, 5 Drawing Sheets

(56) References Cited

U.S. PATENT DOCUMENTS

| | | |
|---|---|---|
| 7,181,398 B2 * | 2/2007 | Thong et al. .................. 704/254 |
| 2001/0020226 A1 * | 9/2001 | Minamino et al. ............ 704/251 |
| 2005/0021331 A1 * | 1/2005 | Huang et al. .................. 704/231 |
| 2006/0106604 A1 | 5/2006 | Okimoto |
| 2008/0162137 A1 * | 7/2008 | Saitoh et al. .................. 704/251 |
| 2008/0255841 A1 | 10/2008 | Hanazawa et al. |

FOREIGN PATENT DOCUMENTS

| | | |
|---|---|---|
| JP | 6 27990 | 2/1994 |
| JP | 2001-117583 | 4/2001 |
| JP | 2001 117583 | 4/2001 |
| JP | 2005 31255 | 2/2005 |
| JP | 2008 262279 | 10/2008 |
| WO | 2004 044887 | 5/2004 |
| WO | WO 2004/044887 A1 | 5/2004 |

OTHER PUBLICATIONS

Japanese Office Action issued Jan. 22, 2013, in Patent Application No. 2011-502684 (with English-language translation).

Chinese Office Action issued Oct. 17, 2012 in Patent Application No. 201080010154.9 with English Translation.

International Search Report issued Feb. 23, 2010 in PCT/JP10/051030 filed Jan. 27, 2010.

\* cited by examiner

| FACILITY ID NUMBER | FACILITY NAME | MORPHEME DICTIONARY (REPRESENTED BY HIRAGANA) |
|---|---|---|
| 1 | KAMAKURA KYODOKAN | KAMAKURA KYODOKAN |
| 2 | KAMAKURA KOEN | KAMAKURA KOEN |
| 3 | YOKOHAMA KOKUSAI SOGO KYOGIJO | YOKOHAMA KOKUSAI SOGO KYOGIJO |
| 4 | YOKOHAMA EKI | YOKOHAMA EKI |
| ... | ... | ... |

Fig. 2

| RECOGNITION ORDER | REPRESENTATION | ACOUSTIC LIKELIHOOD | LANGUAGE LIKELIHOOD | RECOGNITION SCORE |
|---|---|---|---|---|
| 1 | YOKOHAMAKYUGIJO | 50 | -8 | 42 |
| 2 | YOKOHAMAKYOGIJO | 51 | -10 | 41 |
| ... | | | | ... |

Fig. 3

| RECOGNITION ORDER | REPRESENTATION | ACOUSTIC LIKELIHOOD | LANGUAGE LIKELIHOOD (AFTER CORRECTION) | RECOGNITION SCORE |
|---|---|---|---|---|
| 1 | YOKOHAMAKYUGIJO | 51 | -5 | 46 |
| 2 | YOKOHAMAKYOGIJO | 50 | -8 | 42 |
| ... | | | | ... |

Fig. 4

| SYLLABLE | FACILITY ID NUMBER | SYLLABLE | FACILITY ID NUMBER |
|---|---|---|---|
| KA | 1,2,... | HA | 3,4,... |
| MA | 1,2,3,4,... | ... | ... |
| KU | 1,2,3,... | KYO | 1,3,.. |
| ... | ... | GI | 3,... |
| YO | 3,4,... | JO | 3,... |
| KO | 2,3,4 | ... | ... |

VOICE RECOGNITION DEVICE

TECHNICAL FIELD

The present invention relates to a voice recognition device for efficiently carrying out voice recognition for a large vocabulary including, for example, facility names.

BACKGROUND ART

If a voice recognition system is built for recognizing names of hotels and tourist facilities, a user may not know official names thereof, and it is thus conceivable to provide a plurality of names (paraphrased words) for one facility. For "Yokohama Prince Hotel", for example, in addition to "Yokohama Prince Hotel", names such as "Yokohama Prince" and "Prince Hotel" may be provided as a vocabulary to be recognized. This technology is described in JP 2005-202198 A (Patent Literature 1) and JP 2001-083982 A. (Patent Literature 2).

However, the voice recognition is generally realized by a pattern matching between a time sequence of feature vectors acquired by means of an acoustic analysis of a voice and a voice pattern model acquired by modeling a pattern of a time sequence of feature vectors of a vocabulary to be recognized, and if voice pattern models are provided for a large number of paraphrased words, there occurs a problem that a quantity of calculation for the pattern matching becomes enormous. There is another problem that even if paraphrased words are manually or automatically generated, it is difficult to generate all paraphrased words. There is still another problem that a large amount of labor is required for building rules and databases for the automatic generation.

CITATION LIST

Patent Literature

[PTL 1] JP 2005-202198 A
[PTL 2] JP 2001-083982 A

SUMMARY OF INVENTION

Technical Problem

The present invention has been devised in order to solve the above-mentioned problems, and has an object of precisely recognizing paraphrased words while restraining the quantity of calculation from increasing. Further, the present invention has an object of reducing labor required for producing generation rules and databases for paraphrased words.

Solution to Problem

A voice recognition device according to the present invention includes:
voice recognition means for applying voice recognition to an input voice by using a language model and an acoustic model, and outputting a predetermined number of recognition results each including a set of a recognition score and a text representation;
a morpheme dictionary memory for holing morpheme dictionaries each obtained by dividing a representation of vocabulary to be recognized into morphemes: and
N-best candidate rearrangement means for: comparing the representation of the recognition result from the voice recognition means to a content of the morpheme dictionary memory; checking whether the representation of the recognition result can be expressed by any one of combinations of the morphemes of the vocabulary to be recognized in the morpheme dictionary memory; correcting the recognition score when the representation can be expressed; and rearranging an order of the recognition results according to the corrected recognition score so as to acquire recognition results.

Advantageous Effects of Invention

With the voice recognition device according to the present invention: the voice recognition means outputs the predetermined number of recognition results including the set of the recognition score and the text representation; and the N-best candidate rearrangement means compares the representation of the recognition result from the voice recognition means to the content of the morpheme dictionary memory, checks whether the representation of the recognition result can be expressed by any one of combinations of the morphemes of the vocabulary to be recognized in the morpheme dictionary memory, corrects the recognition score when the representation can be expressed, and rearranges the order of recognition results according to the corrected recognition score so as to acquire recognition result. Therefore, the amount of calculation for the content comparison to the morpheme dictionaries in the N-best candidate rearrangement means can be decreased, and the recognition precision can be increased at the same time.

BRIEF DESCRIPTION OF DRAWINGS

FIG. 2 An explanatory diagram of an example of contents of a morpheme dictionary memory.
FIG. 3 An explanatory diagram of an example of an output of a voice recognition result of an input voice by voice recognition means.
FIG. 4 An explanatory diagram of an example of a processing result by N-best candidate rearrangement means.

DESCRIPTION OF EMBODIMENTS

First Embodiment

A description is given of an embodiment by taking as an example a case in which names of facilities and tourist spots (hereinafter, for the sake of simplicity, facilities and tourist spots are generally referred to as facilities) all over Japan are recognized by means of voice recognition.

Figure 1:
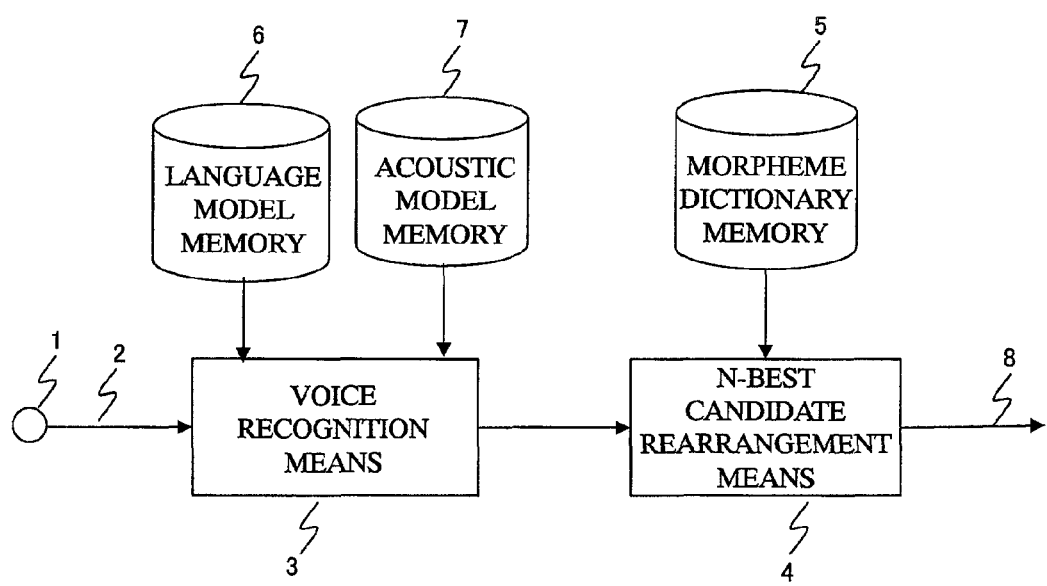
FIG. 1 A block diagram illustrating a configuration of a first embodiment of a voice recognition device according to the present invention.

FIG. 1 is a block diagram illustrating a configuration of a voice recognition device according to a first embodiment of the present invention. In this figure, reference numeral 1 denotes an input terminal for voice; 2, input voice; 3, voice recognition means; 4, N-best candidate rearrangement means; 5, morpheme dictionary memory; 6, language model memory; 7, acoustic model memory; and 9, recognition result.

A statistical language model is generated and stored in advance in the language model memory 6. In this embodiment, trigrams having a syllable as a unit are learned and stored using, as training data, syllable strings, which are representations of facilities all over Japan. An advantage of using the syllable as the unit is that the number of the types of syllables is limited to as few as hundreds regardless of the number of facilities used as the training data, resulting in a language model restraining an increase in calculation quantity during the recognition. Moreover, the employment of the statistical language model enables recognition without providing paraphrased words as training data for the language model, resulting in a reduction in labor required for producing generation rules and databases for the paraphrased words.

The acoustic model memory 7 stores an acoustic model obtained by modeling characteristics of the voice. The acoustic model according to this embodiment is a hidden Markov model (HMM), for example.

The morpheme dictionary memory 5 stores ID numbers and representations of all facility names to be searched for, and representations in hiragana of morphemes of the representations of the facility names. The morphemes can be acquired by applying a morpheme analysis to the representation by using a general morpheme analysis method, thereby extracting the hiragana representation of each of the morphemes. FIG. 2 illustrates an example of contents of the morpheme dictionary memory.

A description is now given of operations of the voice recognition and the search.

When the voice 2 is input from the input terminal 1 for voice, the voice recognition means 3 carries out the voice recognition by means of, for example, the Viterbi algorithm by using the language model stored in the language model memory 6 and the acoustic model stored in the acoustic model memory 7, and outputs N of the top recognition results in a descending order of a recognition score, each including a representation as a syllable string, an acoustic likelihood, a language likelihood, and the recognition score. Note that, the recognition score is a sum of the acoustic likelihood and the language likelihood. In this embodiment, the number N of the recognition results to be output is 50.

In this embodiment, the representation as a syllable string is a hiragana representation, which is the same as in the morpheme dictionary stored in the morpheme dictionary memory 5. FIG. 3 illustrates an output example of the voice recognition means 3 when the utterance of the voice 2 is "yokohama kyogijo (Yokohama kyogijo)". A correct answer "yokohama kyogijo" is in the second place on this occasion.

The N-best candidate rearrangement means 4 receives the N recognition results as an input, checks whether a hiragana representation of each of the N recognition results matches a morpheme dictionary of any of the facilities in the morpheme dictionary memory 5, corrects the language likelihood of the matching recognition results, if the hiragana representation matches a morpheme dictionary, thereby recalculating the recognition scores, and sorts recognition candidates in a descending order of the recalculated recognition score. The term "match" refers to a case in which a syllable string of the recognition result can be represented by a combination of morphemes of a certain facility on this occasion. For example, the recognition candidate "yokohama kyogijo (Yokohama kyogijo)" can be represented by a combination of morphemes "yokohama" and "kyogijo" out of "yokohama, kokusai, sogo, kyogijo", which is a morpheme dictionary of a facility name "Yokohama kokusai sogo kyogijo", and hence the recognition candidate matches the morpheme dictionary. On the other hand, for example, a recognition result "yokohama kyugijo (Yokohama kyugijo)" does not match because "kyugijo" is not present in the morpheme dictionary.

Figure 5:
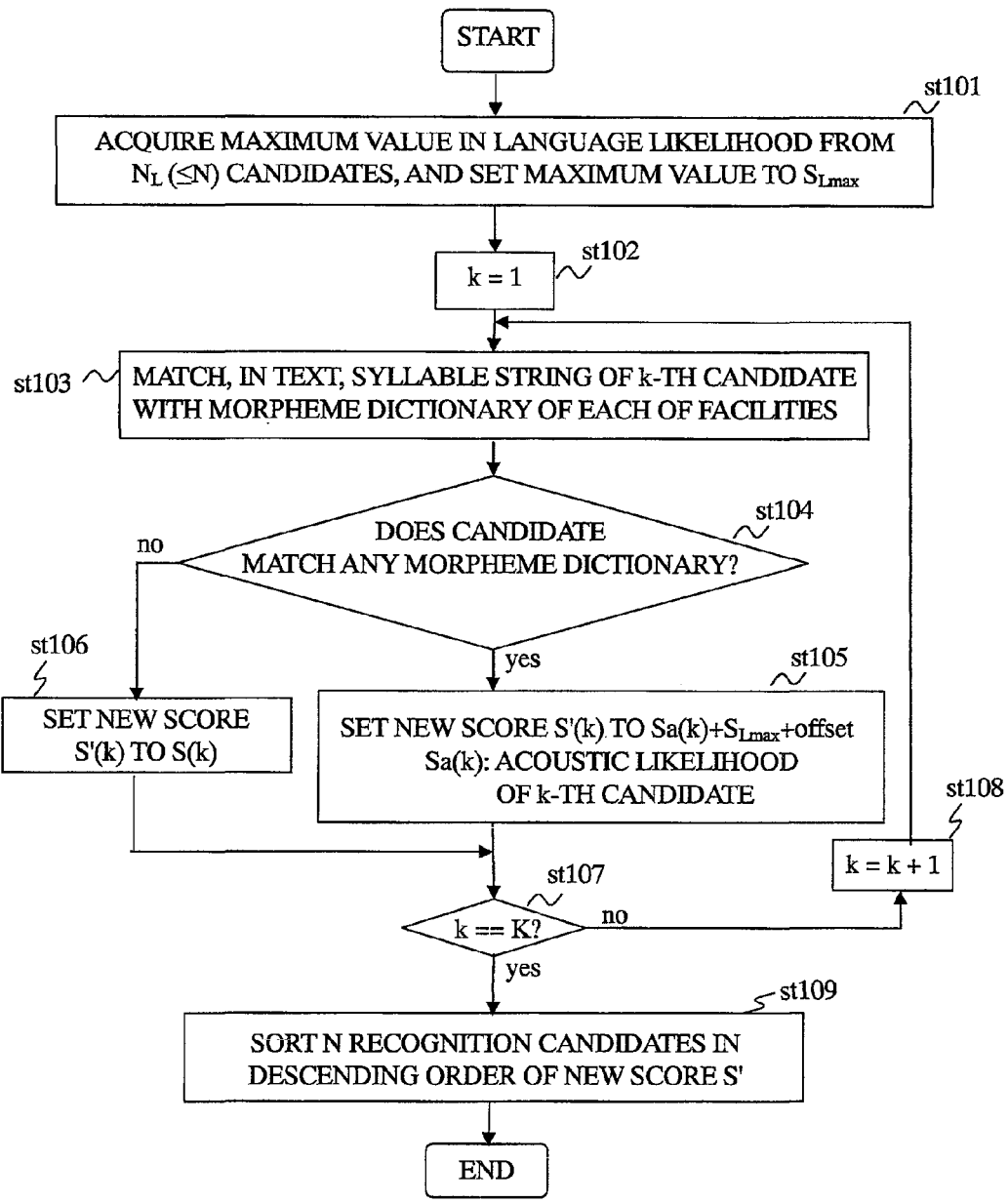
FIG. 5 A flow chart of specific processing steps of the N-best candidate rearrangement means according to the first embodiment.

A description is now given of specific processing steps of the N-best candidate rearrangement means 4 with reference to FIG. 5.

Step 1) The maximum value in language likelihood is acquired from the top $N_L$ recognition results out of the input N recognition results, and is set to $S_{Lmax}$. Note that, $N_L$ is a constant satisfying $N_L \leq N$, and is 10, for example (st101 in FIG. 5).

Step 2) k is set to 1 (st102 in FIG. 5).

Step 3) A k-th syllable string is sequentially compared to a morpheme dictionary of each of the facilities in the morpheme dictionary memory 5, thereby checking whether the k-th syllable string matches a morpheme dictionary of any of the facilities (st103, st104 in FIG. 5).

The definition of the term "match" on this occasion is as mentioned before. When the k-th syllable string matches a morpheme dictionary of any one of the facilities, the processing proceeds to the following step 4 without comparison to subsequent morpheme dictionaries.

Step 4) When the k-th syllable string matches any one of the morpheme dictionaries in the step 3, a new score S'(k) of the k-th syllable string is corrected according to an equation (1):

$$S'(k) = Sa(k) + S'_L \qquad (1)$$

where Sa(k) denotes an acoustic likelihood of the k-th result, and $S'_L$ is a corrected language likelihood, and is acquired according to an equation (2):

$$S'_L = S_{Lmax} + \text{offset} \qquad (2)$$

where $S_{Lmax}$ is the maximum value of the language likelihood acquired in the step 2 and offset is a constant determined in advance. According to this embodiment, offset is set to 3, for example. In the example illustrated in FIG. 3, $S_{Lmax}$ is the language likelihood in the first place in the recognition and is −8, and $S'_L$ is thus −8+3=−5.

On the other hand, when the k-th syllable string does not match, the new score S'(k) is determined according to an equation (3). In other words, the score is not changed (st106 in FIG. 5).

$$S'(k) = S(k) \qquad (3)$$

Step 5) The processing proceeds to a step 6 when k=K. When k<K, k is set to k+1, and the processing returns to the step 3 (st107, st108 in FIG. 5). On this occasion, K is a constant satisfying K≤N. In this embodiment, K is N, namely, K is 50.

Step 6) The recognition result is rescored by using the new score S'(k) (k=1 to K) corrected in the step 5, thereby determining final recognition result (st109 in FIG. 5).

The processing operation according to the first embodiment has been described above. As described in the step 3, the method according to the first embodiment provides an effect of promoting the recognition by increasing a recognition score for "a paraphrased word that can be acquired in consideration of omission of any morphemes and switching of words in a word sequence". FIG. 4 illustrates a result of the application of the method according to the first embodiment to the result illustrated in FIG. 3. It is observed that "yokohama kyogijo (Yokohama kyogijo)", which is the correct answer, is in the first place in the recognition. The reason for this is as follows. "yokohama kyogijo" matches a morpheme dictionary whose facility ID is 3, and the language likelihood thereof has been corrected to increase. However, "yokohama kyugijo", which was in the first place at the time of the input to the N-best candidate rearrangement means 4, does not match any of the morpheme dictionaries, and hence the likelihood is not corrected, with the result that the recognition score thereof with respect to that of "yokohama kyogijo" is reversed.

In this embodiment, when a syllable string matches any of the morpheme dictionaries, the recognition score is corrected by correcting the language likelihood according to the equation (1). However, the recognition score may be corrected by adding a constant offset value as represented by an equation (4), which provides a similar effect:

$$S'(k)=S(k)+\alpha \qquad (4)$$

where $\alpha$ is a constant larger than 0, which is experimentally acquired, and is 10, for example.

Moreover, in this embodiment, the morpheme dictionary stored in the morpheme dictionary memory 5 is constructed only by morphemes of a facility name as illustrated in FIG. 2, but vocabulary which a user tends to utter along with the facility name may be added. For example, "Yokohama kokusai sogo kyogijo" is located in Kanagawa-ken, and a user possibly utters "kanagawaken no yokohama kokusai sogo kyogijo" It is conceivable to add a morpheme "kanagawakenno" to the morpheme dictionary in order to address this case.

Moreover, in this embodiment, the morpheme dictionary is constructed only by morphemes of a facility name as illustrated in FIG. 2, but synonyms and quasi-synonyms of the morphemes may be added. For example, when a morpheme dictionary of a facility name "Yokohama gorufujo" is "yokohama, gorufujo", "kantorikurabu" and the like may be added to the morpheme dictionary as quasi-synonyms of "gorufujo".

Moreover, in this embodiment, the trigram having a syllable as a unit is stored in the language model memory 6, but any unit such as a word or a morpheme may be used as the unit. Further, arbitrary units such as syllables, words, and morphemes may be combined. Still further, the bigram and the n-gram may be used as the statistical language model.

Moreover, a language model in which arbitrary connections are permitted among recognition units such as syllables, words, and morphemes, and a syntax-based language model which defines connection rules among the recognition units such as syllables, words, and morphemes may be used in place of the statistical language model. When the statistical language model is not used, the language likelihood is not calculated, and the equation (4) may be used for correcting the recognition score.

Second Embodiment

Figures 6, 7:
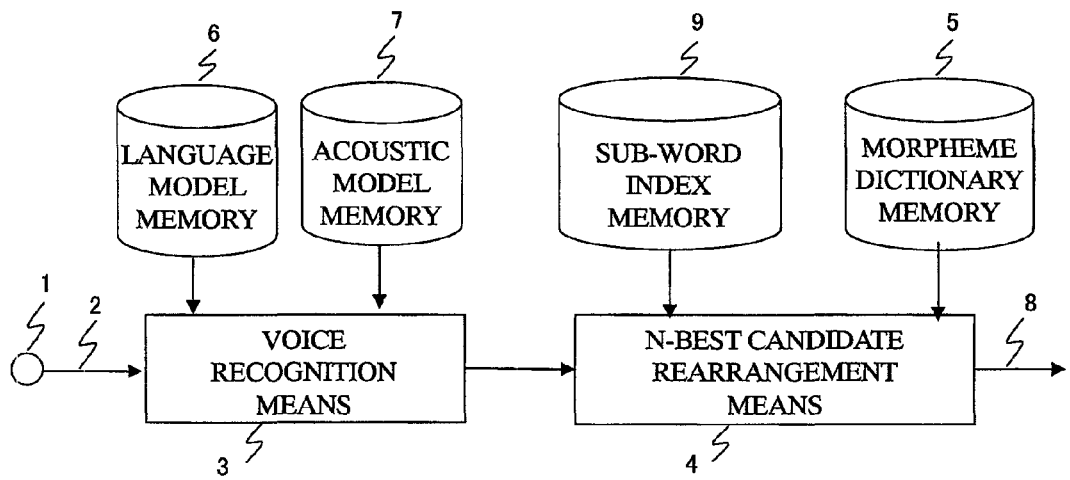
FIG. 6 A block diagram illustrating a configuration of a second embodiment of the voice recognition device according to the present invention.
FIG. 7 An explanatory diagram of an example of contents of a sub-word-index memory.

A voice recognition device according to this embodiment is constructed by newly adding a sub-word index memory 9 to the voice recognition device according to the first embodiment, thereby changing the operation of the N-best candidate rearrangement means as described later. A configuration example of the voice recognition device according to this embodiment is illustrated in FIG. 6.

The voice recognition device is the same as that of the first embodiment except for the sub-word index memory 9, and a description thereof is therefore omitted.

The sub-word index memory 9 is a memory for holding an inverted index produced in advance using the hiragana representations of all the facility names to be recognized. An example of contents of the sub-word index memory 9 is illustrated in FIG. 7. As illustrated in this figure, the sub-word index is constructed by extracting syllables from hiragana representations of all the facility names to be recognized, and enumerating, for each of the syllables, ID numbers of the facility names which contain the syllable. For example, when the facility names to be recognized are those illustrated in FIG. 2, facilities which contain a syllable "ka" are "kamakura kyodokan (Kamakura kyodokan)", "kamakura koen (Kamakura koen)", and the like. ID numbers of these two facilities are 1 and 2, and hence facility ID numbers corresponding to the syllable "ka" in the sub-word index memory 9 are thus 1, 2, . . . .

A description is now given of an operation of this embodiment. When the voice 2 is input from the input terminal 1 for voice, the voice recognition means 3 operates as in the first embodiment, and outputs N of the top recognition results in a descending order of the recognition score, each including the representation as the syllable string, the acoustic likelihood, the language likelihood, and the recognition score. N is 50 as in the first embodiment.

The N-best candidate rearrangement means 4 receives the N recognition results output by the voice recognition means 3 as an input, and refers to the sub-word index memory 9, thereby restricting morpheme dictionaries to be compared before the comparison to morpheme dictionaries of the respective facilities as described later. This enables a reduction in the number of comparisons to the morpheme dictionaries, thereby reducing a quantity of calculation.

Figure 8:
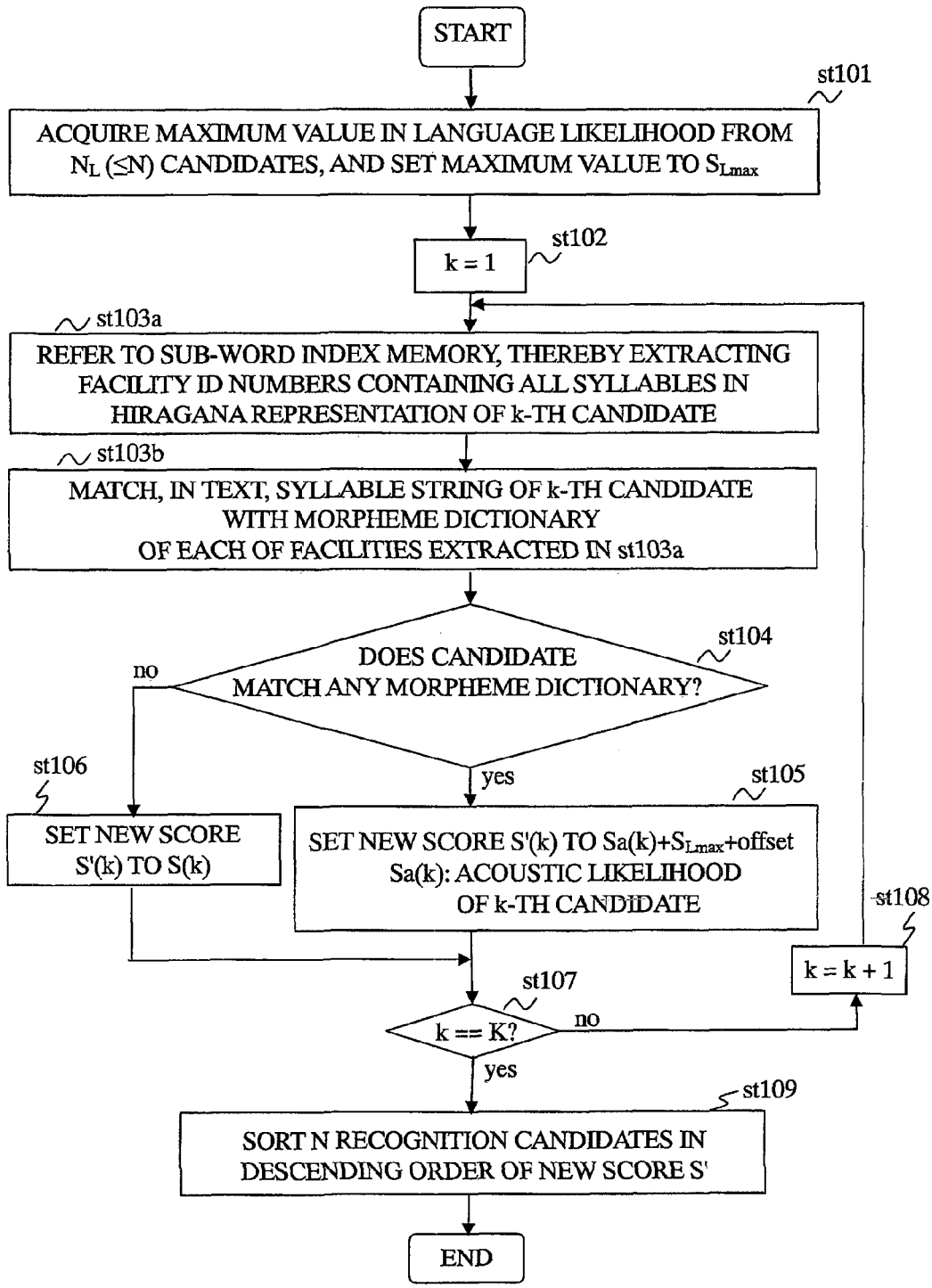
FIG. 8 A flow chart of specific processing steps of the N-best candidate rearrangement means according to the second embodiment.

A description is now given of specific processing steps of the N-best candidate rearrangement means 4 with reference to FIG. 8.

Step 1) The maximum value in language likelihood is acquired from the top $N_L$ recognition results out of the input N candidates, and is set to $S_{Lmax}$. Note that, $N_L$ is a constant satisfying $N_L \leq N$, and is 10, for example (st101 in FIG. 8).

Step 2) k is set to 1 (st102 in FIG. 8).

Step 3a) Then, the N-best candidate rearrangement means 4 refers to the sub-word index memory 9, thereby extracting facility ID numbers containing all syllables in the hiragana representation of the k-th result (st103a in FIG. 8). For the case of the syllable string "yokohamakyogijo" in the second place in FIG. 2, for example, facility ID numbers which contain all syllables of "yo", "ko", "ha", "ma", "kyo", "gi", and "jo" are to be extracted. These facility ID numbers are extracted by referring to the sub-word index memory 9, thereby extracting, for each of the syllables, a set of facility ID numbers containing the syllable, and by then acquiring an intersection ($\cap$) of the extracted sets. For the case of the syllable string "yokohamakyogijo", for example, a set of facility ID numbers containing the syllable "yo" is {3, 4, . . . }; "ko", {2, 3, 4, . . . }; "ha", {3, 4, . . . }; "ma", {1, 2, 3, 4, . . . }; "kyo", {1, 3, . . . }; "gi", {3, . . . }; and "jo", {3, . . . }, and hence facility ID numbers {3, . . . } are extracted as an intersection of these sets. It is observed that morpheme dictionaries of facility names other than those corresponding to the extracted facility ID numbers do not contain one or more of the syllables in "yokohamakyogijo", and hence the morpheme dictionaries of the facility names other than those corresponding to the extracted facility ID numbers do not match "yokohamakyogijo". Therefore, these morpheme dictionaries can be excluded from the objects to be compared.

Step 3b) The syllables of each of the facility ID numbers extracted in the step 3a are sequentially compared to a morpheme dictionary of each of the facilities in the morpheme dictionary memory 5, thereby checking whether the syllables match the morpheme dictionary of any of the facilities (st103b, st104 in FIG. 8).

The definition of the term "match" on this occasion is the same as that of the first embodiment. Moreover, when the syllables match a morpheme dictionary of any one of the facilities, the processing proceeds to the following step 4 without comparison to subsequent morpheme dictionaries as in the first embodiment.

Step 4) When the syllables match any one of the morpheme dictionaries in the step 3b, a new-score S'(k) of the k-th candidate is corrected according to the equation (1) or the equation (4) as in the first embodiment (st105 in FIG. 8).

On the other hand, when the syllables do not match, the score is not changed as in the first embodiment (st106 in FIG. 8).

Step 5) The processing proceeds to a step 6 when k=K. When k<K, k is set to k+1, and the processing returns to the step 3a (st107, st108 in FIG. 8). On this occasion, K is a constant satisfying K<N. In this embodiment, K is N, namely, K is 50.

Step 6) The recognition result is rescored by using the new score S'(k) (k=1 to K) corrected in the step 5, thereby determining final recognition result (st109 in FIG. 8).

In the voice recognition device according to this embodiment, the N-best candidate rearrangement means 4 refers to the sub-word index memory 9, and extracts facility ID numbers containing all the syllables in the hiragana representation of the k-th candidate in the step 3a, and the matching for the hiragana representation of the k-th candidate is carried out only with the morpheme dictionaries of the extracted facility IDs in the step 3b as described above. Therefore, the number of comparisons to the morpheme dictionaries can be reduced, thereby reducing the quantity of the calculation.

Note that, in this embodiment, the morpheme dictionary stored in the morpheme dictionary memory 5 is constructed only by morphemes of a facility name as illustrated in FIG. 2, but vocabulary which a user tends to utter along with the facility name may be added. For example, "Yokohama-kokusai-sogo-kyogijo" is located in Kanagawa-ken, and a user possibly utters "kanagawa ken no yokohama kokusai sogo kyogijo" It is conceivable to add a morpheme "kanagawakenno" to the morpheme dictionary in order to address this case.

Moreover, in this embodiment, the morpheme dictionary is constructed only by morphemes of a facility name as illustrated in FIG. 2, but synonyms and quasi-synonyms of the morphemes may be added. For example, when a morpheme dictionary of a facility name "Yokohama gorufujo" is "yokohama, gorufujo", "kantorikurabu" and the like may be added to the morpheme dictionary as quasi-synonyms of "gorufujo".

Moreover, in this embodiment, the trigram having a syllable as a unit is stored in the language model memory 6, but any unit such as a word or a morpheme may be used as the unit. Further, arbitrary units such as syllables, words, and morphemes may be combined. Still further, the bigram and the n-gram may be used as the statistical language model.

Moreover, a language model in which arbitrary connections are permitted among recognition units such as syllables, words, and morphemes, and a syntax-based language model which defines connection rules among the recognition units such as syllables, words, and morphemes may be used in place of the statistical language model. When the statistical language model is not used, the language likelihood is not calculated, and the equation (4) may be used for correcting the recognition score.

INDUSTRIAL APPLICABILITY

The voice recognition device according to the present invention can be applied to a device for search in a database by means of voice recognition, such as a voice-recognition navigation device for, for example, a car navigation device.

The invention claimed is:

1. A voice recognition device, comprising:
a voice recognition section configured to apply voice recognition to an input voice by using a language model and an acoustic model, and output a predetermined number of recognition results each including a set of a recognition score and a text representation;
a morpheme dictionary memory configured to hold morpheme dictionaries each obtained by dividing a representation of vocabulary to be recognized into morphemes; and
an N-best candidate rearrangement section configured to compare the text representation of the recognition result from the voice recognition section to a content of the morpheme dictionary memory, check whether the text representation of the recognition result can be expressed by any one of combinations of the morphemes of the vocabulary to be recognized in the morpheme dictionary memory, correct the recognition score when the text representation can be expressed, and rearrange an order of the recognition results according to the corrected recognition score so as to acquire recognition results.

2. A voice recognition device according to claim 1, further comprising a sub-word index memory configured to hold an inverted index for the vocabulary to be recognized, the inverted index having a sub-word, exemplified by a phoneme or a syllable, used as an index term,
wherein the N-best candidate rearrangement section is configured to receive, as an input, the representation of the recognition result from the voice recognition section, refer to the sub-word index memory so as to extract vocabulary to be recognized containing all sub-words in the representation of the recognition result, and compare only the extracted vocabulary to be recognized to the morpheme dictionaries in the morpheme dictionary memory.

3. A voice recognition device according to claim 1, wherein the morpheme dictionary contains the morphemes of the representation of the vocabulary to be recognized as well as a representation of a morpheme of vocabulary which is possible to be uttered along with the vocabulary to be recognized.

4. A voice recognition device according to claim 1, wherein the morpheme dictionary contains the morphemes of the representation of the vocabulary to be recognized as well as morphemes of a representation of a synonym or a quasi-synonym of the morphemes of the representation of the vocabulary to be recognized.

5. A voice recognition device according to claim 2, wherein the morpheme dictionary contains the morphemes of the representation of the vocabulary to be recognized as well as a representation of a morpheme of vocabulary which is possible to be uttered along with the vocabulary to be recognized.

6. A voice recognition device according to claim 2, wherein the morpheme dictionary contains the morphemes of the representation of the vocabulary to be recognized as well as morphemes of a representation of a synonym or a quasi-synonym of the morphemes of the representation of the vocabulary to be recognized.

7. A voice recognition device according to claim 3, wherein the morpheme dictionary contains the morphemes of the representation of the vocabulary to be recognized as well as morphemes of a representation of a synonym or a quasi-synonym of the morphemes of the representation of the vocabulary to be recognized.

8. A voice recognition device according to claim 5, wherein the morpheme dictionary contains the morphemes of the representation of the vocabulary to be recognized as well as morphemes of a representation of a synonym or a quasi-synonym of the morphemes of the representation of the vocabulary to be recognized.

\* \* \* \* \*